United States Patent
du Bois

(10) Patent No.: US 6,932,395 B1
(45) Date of Patent: Aug. 23, 2005

(54) WINDOW ASSEMBLY WITH RELEASE MECHANISM

(75) Inventor: Steffen R. du Bois, Riverside, CA (US)

(73) Assignee: SE-GI Products, Inc., Norco, CA (US)

( * ) Notice: Subject to any disclaimer, the term of this patent is extended or adjusted under 35 U.S.C. 154(b) by 0 days.

(21) Appl. No.: 10/431,481

(22) Filed: May 7, 2003

(51) Int. Cl.⁷ ............................................. E05B 3/00
(52) U.S. Cl. ...................... 292/336.3; 292/125; 49/141
(58) Field of Search ........................... 292/336.3, 125, 292/133, 171, 141, 225; 49/141

(56) References Cited

U.S. PATENT DOCUMENTS

| | | | |
|---|---|---|---|
| 4,104,834 A * | 8/1978 | Anghinetti et al. .............. 52/1 |
| 4,313,280 A | 2/1982 | Ehret et al. |
| 4,470,276 A * | 9/1984 | Bayless ......................... 70/91 |
| 4,815,304 A * | 3/1989 | Kesselman ..................... 70/34 |
| 4,819,295 A * | 4/1989 | Kaftan ........................... 16/72 |
| 4,970,825 A * | 11/1990 | Knarvik ......................... 49/44 |
| 5,398,447 A * | 3/1995 | Morse .......................... 49/185 |
| 5,659,999 A * | 8/1997 | Benson ......................... 49/404 |
| 5,787,643 A | 8/1998 | Schmuck |
| 5,787,744 A * | 8/1998 | Berger et al. ................. 70/422 |
| 5,941,022 A | 8/1999 | Schmuck |
| 6,125,583 A * | 10/2000 | Murray et al. ................ 49/291 |
| 6,547,292 B1 * | 4/2003 | Keller ......................... 292/242 |
| 6,601,270 B2 * | 8/2003 | Eckhardt et al. .............. 16/412 |

* cited by examiner

Primary Examiner—Gary Estremsky
(74) Attorney, Agent, or Firm—Knobbe, Martens, Olson & Bear, LLP

(57) ABSTRACT

A window assembly having an emergency release mechanism that can be actuated by a release handle is provided. The release handle can be moved from an initial, non-releasing position to an intermediate, non-releasing position, and then to a final, releasing position where the window assembly is unlatched. The release handle can be biased in different raised positions by a biasing mechanism that utilizes a compression spring to apply lateral pressure to the release handle hinge. The amount of force required to move the handle can be easily adjusted by varying the amount of pressure exerted by the compression spring on the release handle hinge.

13 Claims, 7 Drawing Sheets

WINDOW ASSEMBLY WITH RELEASE MECHANISM

BACKGROUND OF THE INVENTION

1. Field of the Invention

This invention relates to window assemblies, and in particular, to a window assembly having an emergency release mechanism adapted for quick and easy release of the window from a mounting structure.

2. Description of the Related Art

Window assemblies designed for mass transportation vehicles such as buses, motor coaches, and railroad passenger cars are often equipped with release mechanisms that provide for quick release of the window in emergencies. These window assemblies are typically hingedly mounted in the vehicle wall and latched in a closed position during normal operations. In emergencies, the window can be manually unlatched and pivoted outwardly to expose an opening through which passengers can exit from the vehicle.

Various emergency release mechanisms have been incorporated in window assembly designs for mass transportation vehicles. U.S. Pat. No. 4,313,280 entitled "QUICK OPENING LATCH ARRANGEMENT FOR HINGED VEHICLE WINDOWS" discloses a window construction having an emergency release mechanism that utilizes a release bar secured by a keeper mounted adjacent to the release bar. In this type of design, it is generally recognized that the release bar and keeper must be manufactured and installed to a tight tolerance for the mechanism to work properly. Moreover, any distortion and warping of the parts through use will greatly affect the operability of the release mechanism. U.S. Pat. Nos. 5,787,643 and 5,941,022 both entitled "WINDOW WITH LATCH ASSEMBLY" disclose a window assembly that utilizes a rotary latch to lock the window assembly in a closed position. The window assembly can be unlatched by raising a release bar that is operatively connected to the rotary latch. This design requires a person to apply sufficient force to overcome the frictional force between the release bar hinge and a leaf spring and cause a protrusion on the hinge to slide into a detent on the leaf spring. Disadvantageously, the amount of force required to raise the release bar cannot be easily adjusted as the required force is dictated by inherent design features such as the contact surface area and pressure between the release bar hinge and leaf spring.

Hence from the foregoing, it will be appreciated that there is need for a window assembly having a release mechanism that is adapted for easy and quick release of the window in emergencies. To this end, there is a particular need for a window assembly having an emergency release mechanism whereby the amount of force required to actuate the mechanism can be adjusted to suit a particular need.

SUMMARY OF THE INVENTION

The aforementioned needs are satisfied by the window assembly of the preferred embodiments of the present invention. In one aspect, the preferred embodiments of the present invention comprise a window assembly having a frame configured to receive and support a glazing, wherein the frame is positioned adjacent the opening and can be pivoted outwardly from the opening. The window assembly further comprises a latch assembly, wherein the latch assembly is adapted to secure the frame to the wall in a closed, latched position and release the frame from the wall to an open, unlatched position. The window assembly also comprises a release assembly having a release handle and at least one hinge member. Preferably, the release handle is operatively interconnected to the latch assembly and configured to actuate the latch assembly to release the frame from the wall. In one embodiment, the release handle is moved from an initial, non-releasing position to a final, releasing position when actuating the latch assembly.

Preferably, the release handle can be biased in the final, releasing position by a biasing mechanism. In one embodiment, the biasing mechanism applies a first pressure to the release handle, wherein the first pressure is exerted against the release handle in a direction substantially parallel to the axis of rotation of the release handle. Preferably, the first pressure inhibits the release handle from returning to the initial, non-releasing position. In another embodiment, the biasing mechanism applies a first pressure to a first surface of the release assembly, wherein the first surface extends in a substantially perpendicular direction relative to the longitudinal axis of the release handle.

In some embodiments, the biasing mechanism comprises a compression spring working in conjunction with a hemispherical surface, such as that provided by a steel ball or the like, to apply the first pressure to the side wall of the release assembly. Preferably, the first pressure causes the hemispherical surface to engage with at least one opening formed in the sidewall, thereby inhibiting the sidewall from sliding past the hemispherical surface. In one embodiment, the opening is formed in the sidewall of the release handle hinge. In another embodiment, the opening is formed in the sidewall of a bracket that is attached to and straddles the release handle hinge. In one embodiment, the opening is preferably substantially circular and has a diameter less than that of the steel ball so that the steel ball is only partially received in the opening when a pivoting force is applied to the release handle. In yet another embodiment, the release handle can be moved from the initial, non-releasing position to an intermediate, non-releasing position before reaching the final, releasing position, wherein the biasing mechanism is adapted to hold the release handle at these positions. Similarly, the release handle can be retracted from the final, releasing position to the intermediate, non-releasing position, before reaching the initial, non-releasing position.

In another aspect, the preferred embodiments of the present invention comprises a window assembly adapted for mounting in a wall having an opening. The window assembly comprises a frame configured to receive and support a glazing, a latch assembly adapted to secure the frame in a closed, latched position, a release assembly comprising a release handle and at least one hinge member wherein the release handle is operatively interconnected to the latch assembly by a connecting member. The connecting member is configured to actuate the latch assembly to release the frame from the wall, wherein the release handle is movable from an initial, non-releasing position to an intermediate, non-releasing position before reaching the final, releasing position. Preferably, the connecting member is configured with a pre-determined amount of slack so as to permit the release handle to be lowered from the final, releasing position to the intermediate, non-releasing position so that the release bar can be maintained at the intermediate position without hitting against the window assembly or surrounding wall when the latch assembly is urged against a striker bolt. Moreover, the pre-determined amount of slack is also configured to allow the release handle to be raised from the initial, non-releasing position to the intermediate, non-releasing position without actuating the latch assembly.

In one embodiment, the connecting member comprises a cable that is looped through an opening formed in a trip lever that is adapted to actuate the latch assembly. Preferably, the cable is fixedly attached to the release handle in a manner such that when the release handle is raised, the release handle exerts a pulling force on the cable. When sufficient pulling force is exerted on the cable, the cable becomes taut and exerts a pulling force on the trip lever to actuate the trip lever. Preferably, the cable is configured with a pre-determined amount of slack so that the release handle can be raised from the initial, non-releasing position to the intermediate position without causing the cable to become sufficiently taut to trigger the trip lever. Moreover, the slack also allows the release bar to be retracted from the final, releasing position to the intermediate position so as to allow the latch assembly to strike against the striker bolt without causing the releasing bar to hit against the window assembly or the wall.

DETAILED DESCRIPTION OF THE PREFERRED EMBODIMENT

Figure 1:
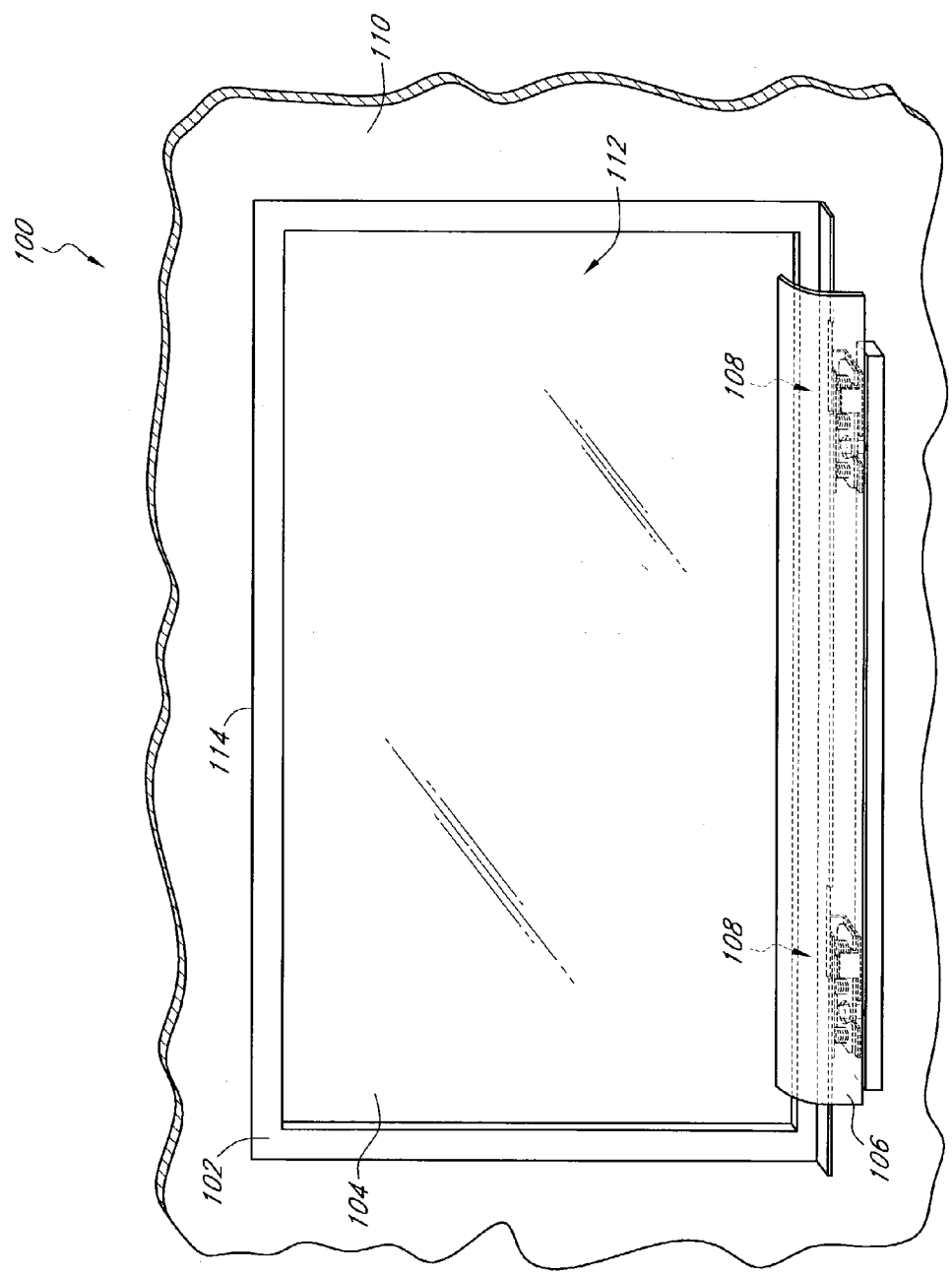
FIG. 1 is a schematic illustration of a window assembly of one preferred embodiment of the present invention.

Reference will now be made to the drawings wherein like numerals refer to like parts throughout. FIG. 1 provides a schematic illustration of a window assembly 100 of one preferred embodiment of the present invention. As shown in FIG. 1, the window assembly 100 generally comprises a frame 102 configured to receive and support a glazing 104, a release handle 106 pivotably attached to the frame 102, and at least one latch assembly 108 operatively interconnected to the release handle 106. As will be described in greater detail below, the window assembly 100 is typically mounted in a wall and retained in a closed, locked position by the latch assembly 108. As will also be described in greater detail below, the window assembly 100 can be unlatched and released from the wall when the latch assembly 108 is actuated by movement of the release handle 106.

The window assembly 100 can be mounted in a wall 110 of a mass transportation vehicle and positioned to fill an opening 112 formed in the wall 110 as shown in FIG. 1. Preferably, the frame 102 and the glazing 104 contained therein cover at least a substantial portion of the opening 112 when the window assembly 100 is in a closed, locked position. In one embodiment, the frame 102 is pivotably attached to the wall 110 and can be pivoted outwardly from the opening 112 along a horizontal axis 114 when the window assembly 100 is unlatched and released from the wall. A variety of known mechanisms can be used to attach the frame 102 to the wall 110. For example, a hinge and flange assembly suitable for such purpose is disclosed in U.S. Pat. No. 5,787,643 entitled "WINDOW WITH LATCH ASSEMBLY", the entirety of which is hereby incorporated by reference.

Figure 2A:
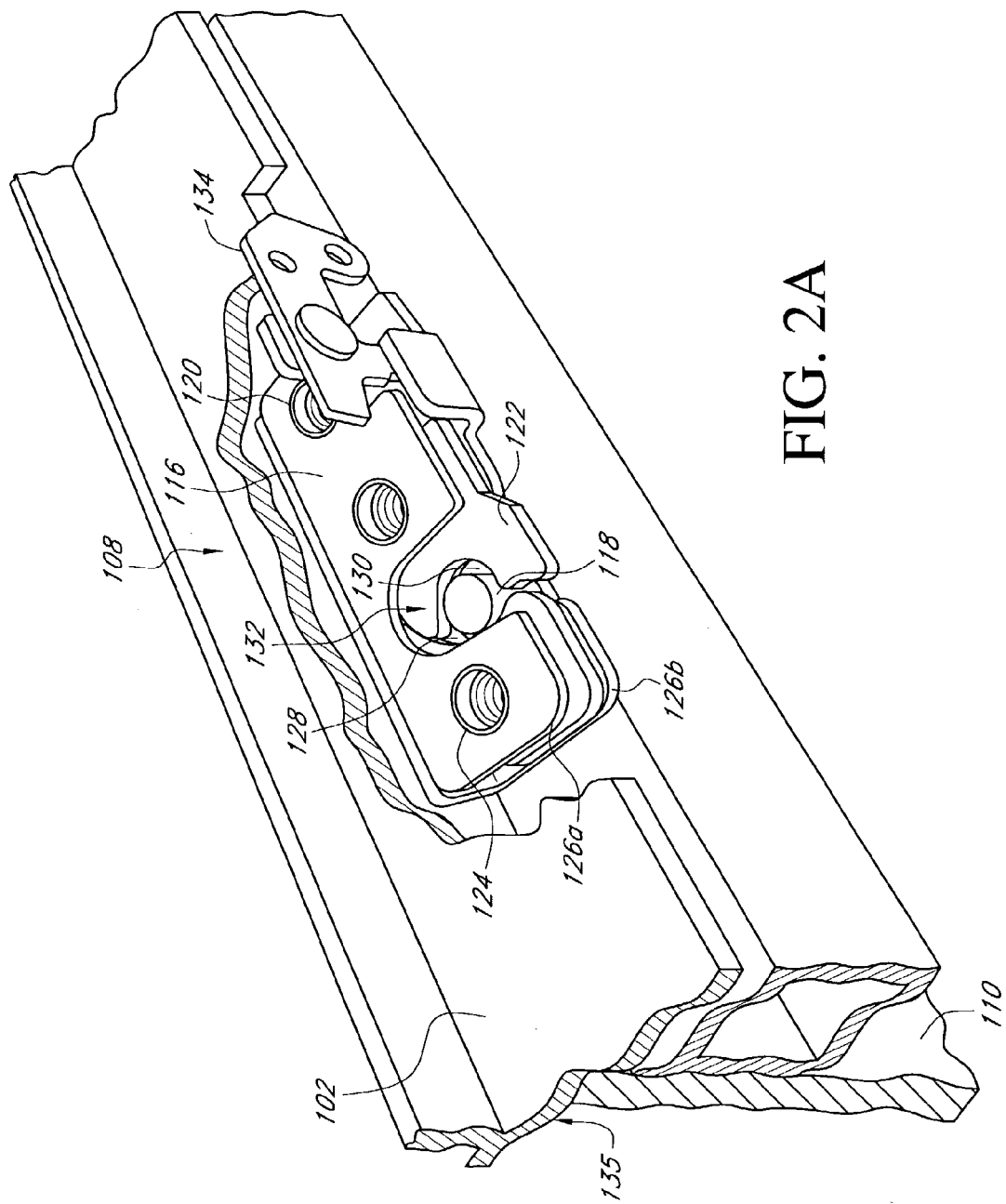
FIGS. 2A and 2B provide exploded views of one embodiment of the latch assembly, showing the manner in which the latch assembly secures and releases the window assembly of one preferred embodiment.
Figure 2B:
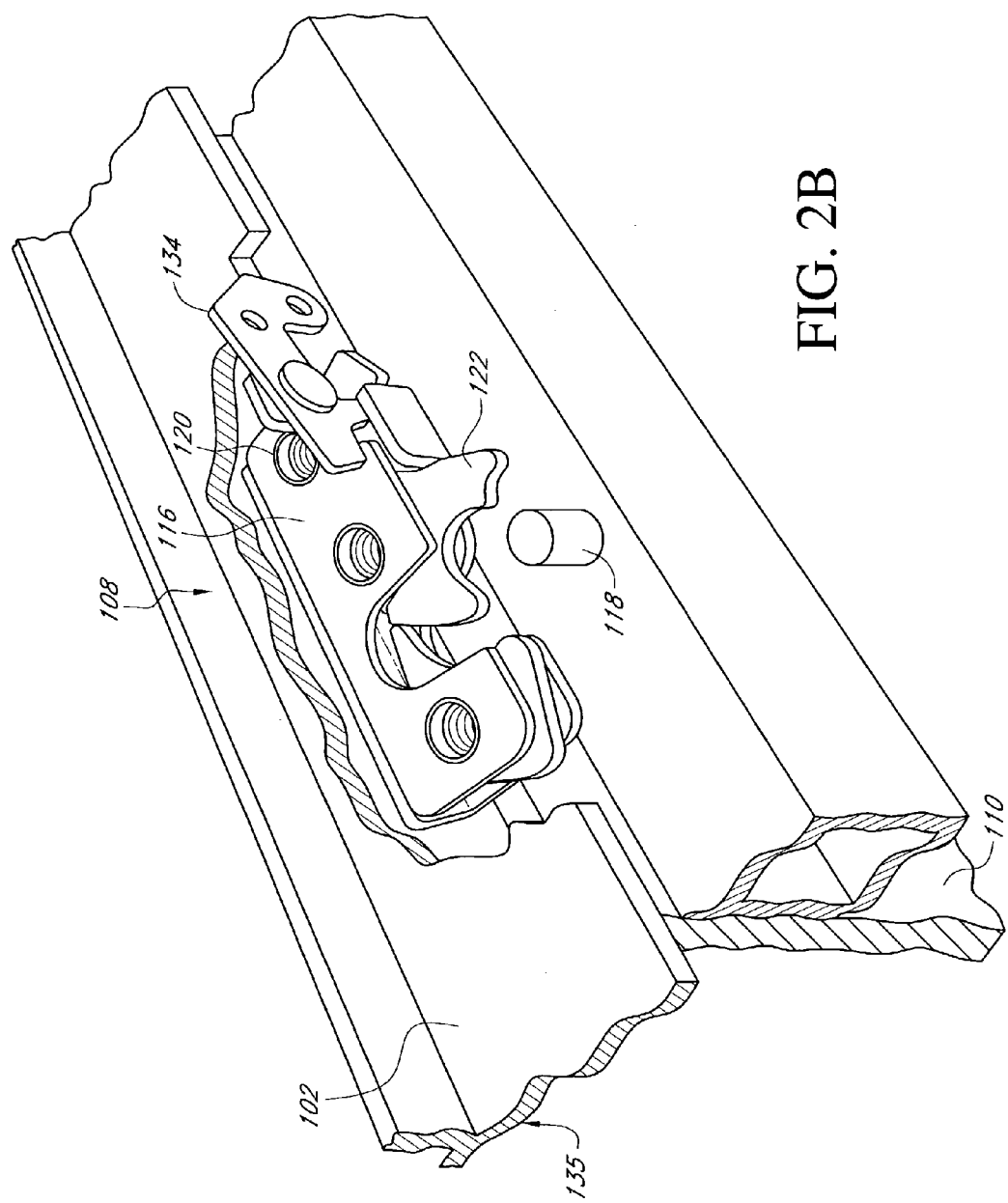

FIGS. 2A and 2B provide exploded views of one embodiment of the latch assembly, showing the manner in which the latch secures and releases the window assembly from the wall. As shown in FIG. 2A, the latch assembly 108 comprises a rotary latch 116 that is configured to cooperate with a striker bolt 118 to secure the window assembly in a closed, locked position. The rotary latch 116 illustrated in FIGS. 2A and 2B is well known and commonly used in the automotive industry. The preferred rotary latch may include but is not limited to commercially available latches sold under the trademark of SLIMLINE ROTARY LATCH by Eberhard Manufacturing Co. of Cleveland, Ohio.

As it is generally understood, the rotary latch 116 typically includes a rotor 120, a catch 122, and a strike 124, each axially seated between two plate supports 126a, 126b. Each plate support 126a, 126b has a radial cut-out 128 in alignment with each other and with a radial cut-out 130 formed in the catch 122. The cut-outs 128, 130 define an opening 132 in the latch 116 for receiving the striker bolt 118. When the striker bolt 118 is positioned in the opening 132, the catch 122 is rotated to enclose the striker bolt 118 so as to secure the window in a closed, locked position as shown in FIG. 2A. The rotor 120 and the catch 122 are typically spring biased in opposite directions and configured to engage with each other in a known manner so as to keep the catch 122 in the locked position. It is also generally understood that when additional force is applied against the spring biased force of the rotor 120, the catch 122 disengages with the rotor 120 and rotates to an open, releasing position as shown in FIG. 2B. In one embodiment, a trip lever 134 is connected to the rotor 120 and can be actuated to rotate the rotor in a direction opposite its biasing force, thus causing the rotor to release and disengage with the catch 122.

The rotary latch 116 is preferably mounted on a lower surface 135 of the frame 102 in a manner such that the opening 132 in the latch 116 extends perpendicularly from the wall 110. The striker bolt 118 can be mounted to the wall 110 or any other structure fixedly attached to the wall. As shown in FIG. 2A, the striker bolt 118 is positioned to extend upwardly into the opening 132 when the window assembly is in a closed position. To lock the window assembly, the frame 102 is urged against the striker bolt 118, causing the striker bolt 118 to contact the catch 122 and exert pressure against the catch in a direction opposite its spring bias so as to force the catch 122 to rotate to a locked position in a known manner. To release the window assembly, the trip lever 134 is actuated to disengage the catch 122 from the rotor 120 and allow the catch 122 to rotate in the direction of its spring bias to an open, releasing position as shown in FIG. 2B. Preferably, the force of the rotational movement causes the catch 122 to push against the fixedly mounted striker bolt 118 with sufficient force so as to cause the window assembly to pivot outwardly from the wall 110 when the catch 122 reaches the final, releasing position.

Figure 3:
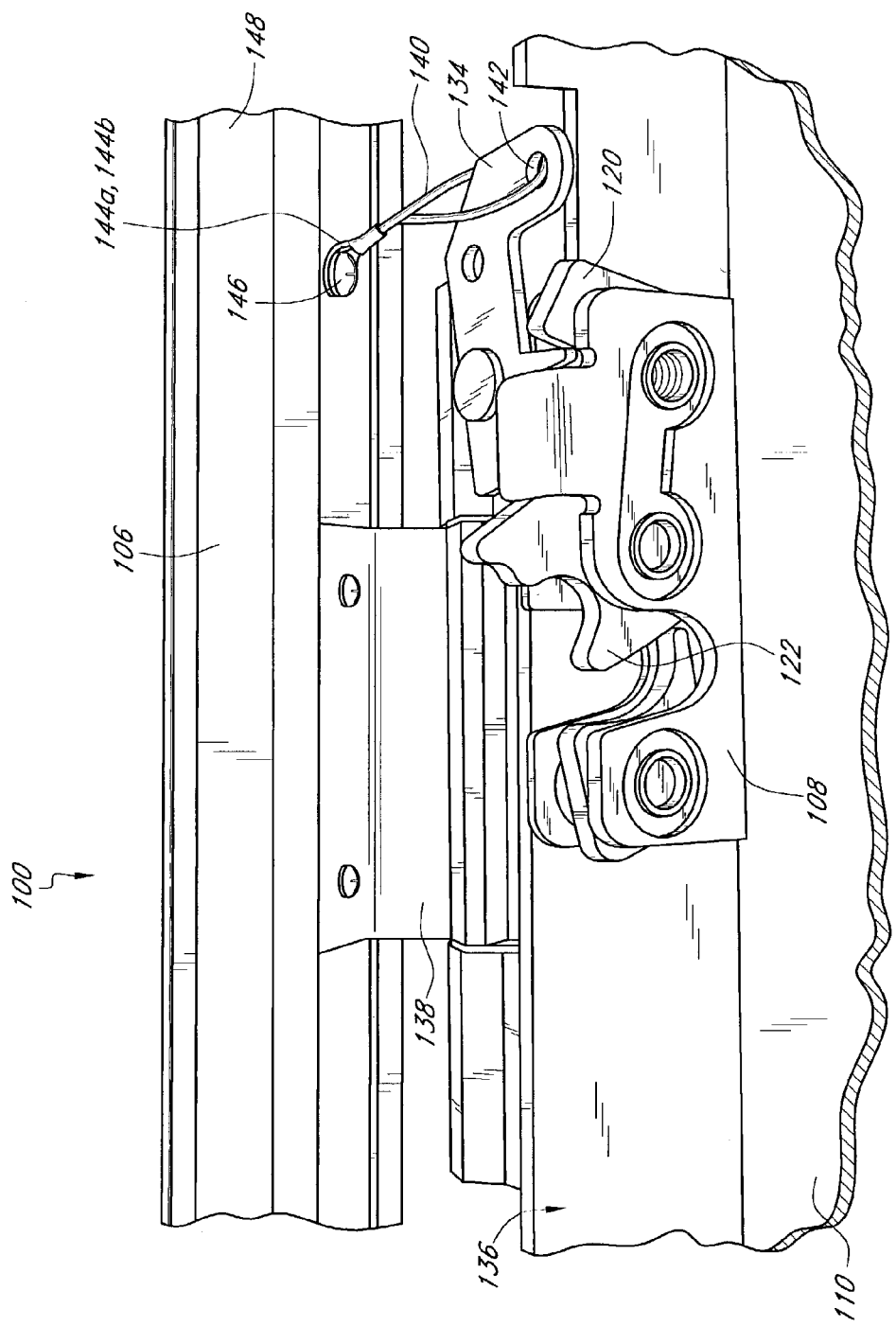
FIG. 3 is a bottom perspective view of the window assembly of FIG. 1, showing the release handle operatively interconnected to the latch assembly of FIGS. 2A and 2B.

FIG. 3 provides a bottom perspective view of the window assembly, showing the manner in which the release handle is operatively interconnected to the latch assembly. As will be described in greater detail below, the release handle is configured to trigger the latch assembly to unlatch and release the window assembly. As shown in FIG. 3, the release handle 106 comprises an elongate bar pivotably attached to a base 136 of the frame 102 by a hinge assembly 138. The hinge assembly 138 allows the release handle 106 to be raised and lowered in a manner to be described in greater detail below. Preferably, the release handle 106 is mounted above and in close proximity to the latch assembly 122 so as to reduce the complexity and extent of interconnection required.

As shown in FIG. 3, the release handle 106 is operatively interconnected to the latch assembly 108 by a connecting member 140. In one embodiment, the connecting member 140 comprises a cable that extends between the release handle 106 and the trip lever 134 of the latch. As shown in FIG. 3, the cable 140 is looped through an opening 142 formed in the trip lever 134 and end portions 144a, 144b of the cable 140 are fixedly attached to an eyelet 146 formed on the underside 148 the release handle 106. To release the window assembly, the release handle 106 is raised to a position where the cable 140 becomes sufficiently taut to exert a pulling force on the trip lever 134. Pulling the trip lever 134 in turn rotates the rotor 120 in a direction opposite to its spring bias, thus disengaging the catch 122 from the rotor 120 and allowing the catch 122 to rotate to an open position and releasing the striker bolt. Moreover, the cable 140 is preferably configured with a pre-determined amount of slack so that the release handle 106 can be raised from an initial non-releasing position to an intermediate non-releasing position without triggering the trip lever 134. The slack also allows the release handle 106 to be kept in the intermediate, non-releasing position when the latch assembly is urged against the striker bolt. The advantages of being able to raise the release handle from the initial non-releasing position to an intermediate non-releasing position before reaching the final, releasing position and to lower the release bar from the final position to the intermediate position before reaching the initial, non-releasing position will be described in greater detail below.

Figure 4C:
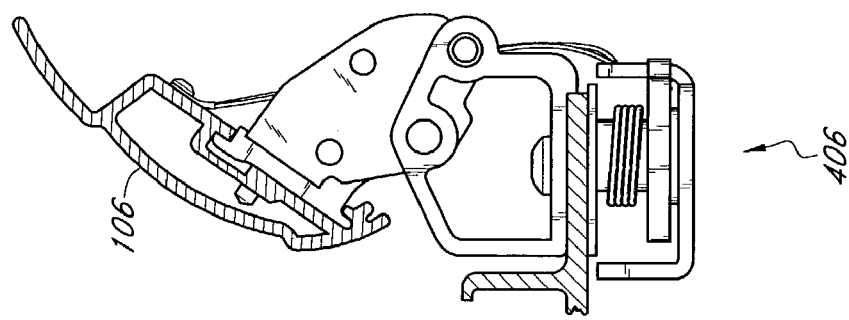
FIGS. 4A, 4B, and 4C provide partial side views of the window assembly of FIG. 1, showing the release handle movable from an initial, non-releasing position to an intermediate, non-releasing position, and then to a final, releasing position.
Figure 4B:
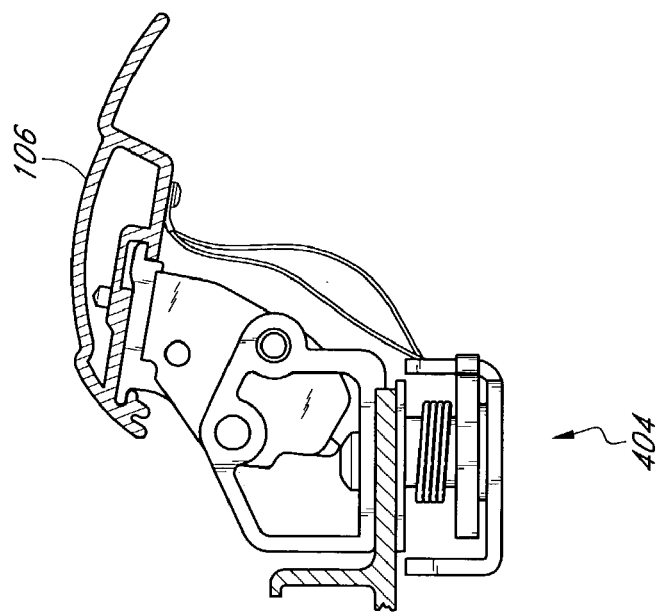
Figure 4A:
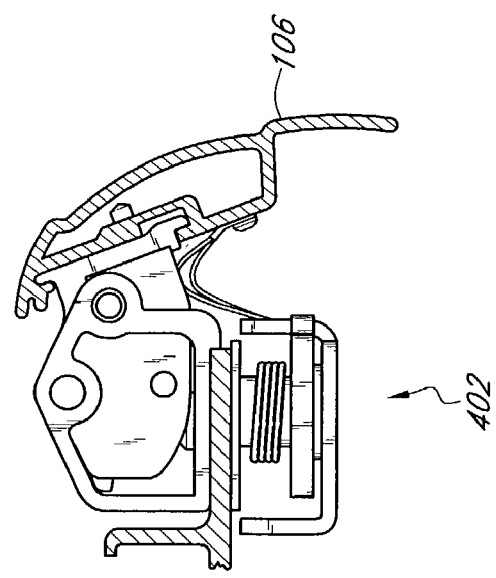

FIGS. 4A, 4B, and 4C provide partial side views of the window assembly, showing the release handle 106 movable from an initial non-releasing position 402 to an intermediate non-releasing position 404, and then to a final, releasing position 406. As also shown in FIGS. 4B and 4C, the release handle 106 can be held in position at the intermediate and final raised positions 404, 406 so that the handle 106 cannot move freely or fall back down to the initial non-releasing position 402 when the window assembly is unlatched from the wall. Advantageously, locking the release handle 106 in the raised positions reduces the likelihood of the release handle being damaged from hitting against other surfaces such as the vehicle wall. This is particularly applicable during the latching step in which the latch assembly is struck against the striker bolt whereby vibration from the contact is likely to cause the release handle to hit against other surfaces if it is not locked in the intermediate position.

In one embodiment, the release handle 106 is configured to provide a tactile signal when the handle 106 is raised to the intermediate, non-releasing position. If no additional force is applied, the handle will remain locked in the intermediate non-releasing position while the window assembly remains latched to the wall. Advantageously, the intermediate, non-releasing position also provides a buffer so that in circumstances where the release handle is accidentally raised, the window assembly is much less likely to become immediately unlatched. The window assembly will be unlatched only if sufficient additional force is applied to move the release handle past the intermediate position to the final releasing position. Thus, if the release handle is inadvertently raised, the handle will likely first lock in the intermediate position and not continue to move upwardly to the releasing position unless additional force is applied.

Figure 5:
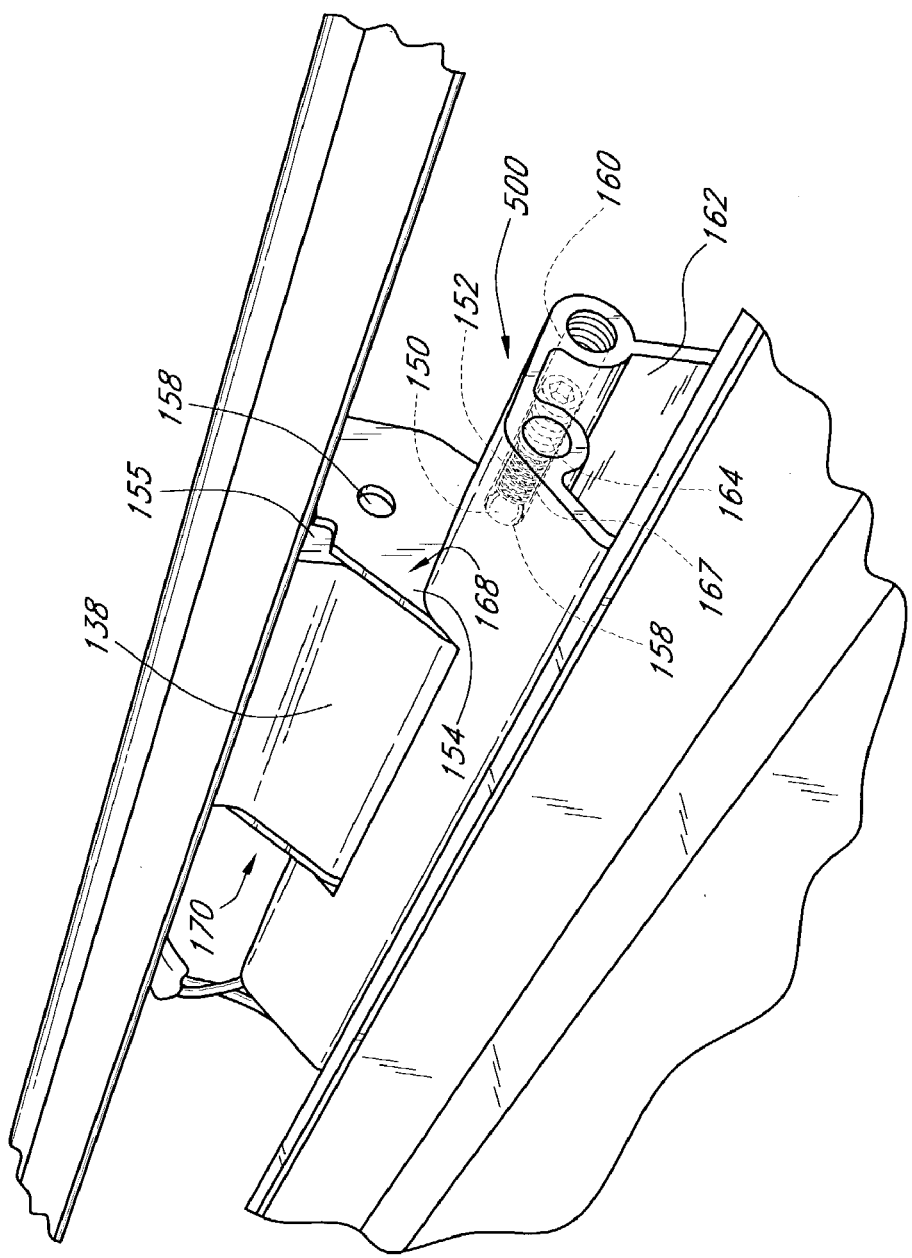
FIG. 5 provides an exploded view of one embodiment of the release handle biasing mechanism, showing the manner in which the release handle can be biased in a raised position.

FIG. 5 provides an exploded view of one embodiment of a biasing mechanism 500 configured to hold the release handle in one or more raised positions. As shown in FIG. 5, the biasing mechanism 500 generally comprises a compression spring 152 working in conjunction with a substantially hemispherical surface 150 such as that provided by a steel ball to apply a lateral pressure to the sidewall 155 of the hinge in a manner so as to inhibit the hinge 138 from moving. In one embodiment, the hemispherical surface 150 engages with the release handle hinge 138 at one or more openings 158 formed in or adjacent the sidewall 155 of the hinge 138 so as to inhibit the hinge from sliding past the hemispherical surface 150.

As shown in FIG. 5, the steel ball 150 is held in position by the compression spring 152 and adapted to engage with a corresponding opening 158 adjacent to the hinge sidewall 155 as the release handle 106 is raised or lowered. Preferably, the location of each opening 158 corresponds to an intermediate non-releasing position or a final, releasing position of the handle 106 when the respective opening is aligned with the ball bearing. In one embodiment, the opening 158 is substantially circular and has a diameter smaller than that of the steel ball or hemispherical surface. The spherical configuration of the steel ball is preferred because it can easily engage or disengage with the smaller diameter circular opening by sliding in and out of the opening. When the hemispherical surface 150 engages with the opening 158, the release handle 106 is locked in place until additional force is applied to the handle to overcome the pressure exerted by the compression spring. Advantageously, the hemispherical surface 150 is only partially received into the opening 158 and thus can be disengaged from the opening when a relatively small amount of additional force is applied to the handle. Moreover, it will be appreciated that the hemispherical surface design is not limited to the steel ball and can provided by a variety of different materials and components or can be integrally constructed as part of the compression spring. For example, in some embodiments, the end portion of the compression spring is rounded and configured for engaging with the opening.

In the embodiment shown in FIG. 5, the compression spring 152 and steel ball 150 are positioned inside a groove 160 formed in a support structure 162 adjacent the hinge 155. An adjustment screw 164 or other similar device can be fitted in a bushing 167 inside the groove and mounted behind the spring. Tightening or loosening of the adjustment screw will in turn compress or decompress the spring 152. The compressed spring 152 in turn exerts a pressure on the steel ball 150 and pushes the ball against the sidewall 155 of the hinge 138. The amount of pressure exerted by the ball on the hinge directly affects the amount of force required to raise or lower the release handle. The biasing mechanism allows for adjustment of the amount of pressure exerted by the ball on the hinge by simply tightening or loosening the adjustment screw.

In another embodiment, the openings 158 for receiving the ball 150 are formed in a sidewall 166 of a bracket 154 that is attached to and straddles the release bar hinge 138 as shown in FIG. 5. Preferably, the bracket 154 is made of a metal or other durable material. One advantage of incorporating the bracket 154 is that the bracket provides additional reinforcement and strength to the hinge assembly. Moreover, the use of the bracket 154 obviates the need of retrofitting existing release bar hinges with sidewall openings. In a preferred embodiment as illustrated in FIG. 5, the biasing mechanism 500 is incorporated to both sides 168, 170 of the hinge 138.

Figure 6:
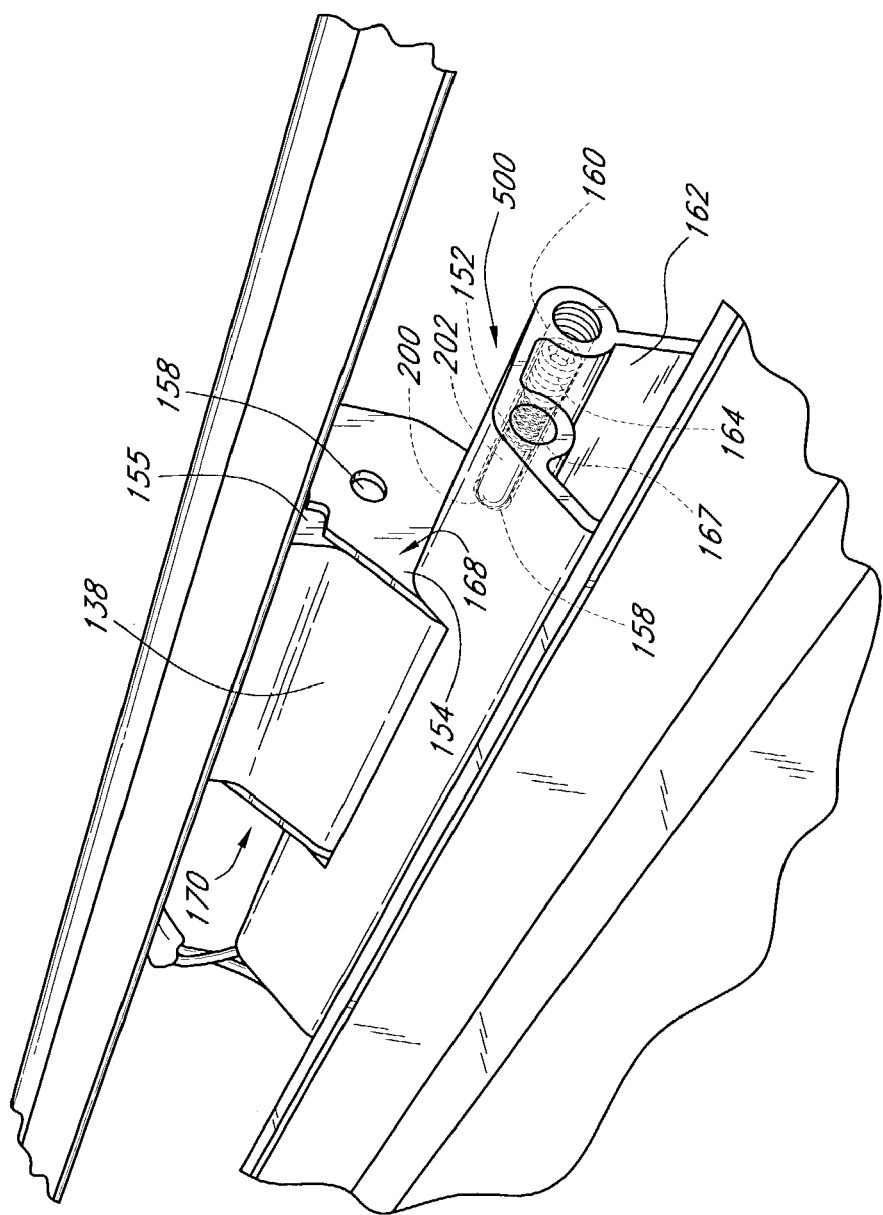
FIG. 6 provides an exploded view of another embodiment of the release handle biasing mechanism.

FIG. 6 shows another embodiment of the biasing mechanism in which the openings 158 engage with a first end 200 of an elongate member 202. Preferably, the first end 200 of the elongate member 202 has a substantially hemispherical surface wherein the hemispherical surface is adapted to engage with the opening 158. In one embodiment, the oblong member 202 is a pin or rod having at least one rounded end 200. Advantageously, the oblong member 202 applies a more even distribution of force to the hinge and generally has improved wear resistance and durability.

In practice, when the release handle 106 is raised or lowered, the sidewalls 166 of the bracket 156 slide past the ball 150 by exerting sufficient pressure against the ball 150 to cause their respective compression springs 152 to slightly compress. However, when the release handle 106 is moved to one of the pre-determined raised positions, the balls 150 are aligned with an opening 158 in each sidewall 166 and pushed into the corresponding opening by the compression springs 152. Preferably, the diameter of each opening 158 is less than that of the ball 150, so that only a portion of each ball is received into the opening while the compression spring continues to push against the ball, resulting in the ball exerting continuous lateral pressure against the sidewall of the bracket. The continuous lateral pressure exerted against the sidewalls of the bracket inhibits the hinge from sliding freely, which in turn causes the release handle to be biased in the raised position.

To raise or lower the release handle from a biased position, sufficient force must be applied to the handle to overcome the lateral pressure exerted against the sidewalls of the hinge by the compression springs. Since the lateral pressure exerted by the springs can be easily adjusted by tightening or loosening the adjustment screws adjacent to the springs, the amount of force required to move the release handle can also be adjusted accordingly. Moreover, the relatively small contact area between the hemispherical surface and the release handle hinge facilitates easy movement of the release bar as there is less friction force to overcome when moving the handle.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions.

What is claimed is:

1. A window assembly adapted for mounting in a wall having an opening, comprising:
   a frame configured to receive and support a glazing, wherein the frame is positioned adjacent the opening and can be pivoted outwardly from the opening;
   a latch assembly adapted to secure the frame to the wall in a closed, latched position and release the frame from the wall to an open, unlatched position;
   a release assembly comprising a release handle and at least one hinge member, wherein the release handle is operatively interconnected to the latch assembly and configured to actuate the latch assembly to release the frame from the wall, wherein the release handle is movable from an initial, non-releasing position to a final, releasing position;
   a biasing mechanism adapted to hold the release handle in the final, releasing position by applying a first pressure to the release handle, wherein the first pressure is exerted against the release handle in a direction substantially parallel to the axis of rotation of the release handle, wherein the first pressure inhibits the release handle from returning to the initial, non-releasing position;
   wherein the biasing mechanism comprises a compression spring working in conjunction with a substantially hemispherical surface to apply the first pressure to the side wall of the release assembly, wherein the first pressure causes the substantially hemispherical surface to engage with at least one opening formed in the side wall, thereby inhibiting the side wall from sliding past the hemispherical surface;
   wherein the at least one opening is positioned to engage with the substantially hemispherical ball when the release handle is moved to the final, releasing position, wherein at least a portion of the substantially hemispherical ball provides the substantially hemispherical surface; and
   wherein the at least one opening is positioned to engage with a first end of an elongate member, wherein the first end has a substantially hemispherical surface.

2. The window assembly of claim 1, wherein the elongate member comprises a pin having at least one rounded end.

3. The window assembly of claim 1, wherein the at least one opening is formed in the sidewall of the release handle hinge.

4. The window assembly of claim 1, wherein the release handle can be moved from the initial, non-releasing position to an intermediate, non-releasing position before reaching the final, releasing position; wherein the biasing mechanism is adapted to hold the release handle at these positions.

5. The window assembly of claim 1, wherein the at least one opening is substantial circular and has a diameter less than that of the substantially spherical ball so that the ball is only partially received in the opening in a manner such that the ball can slide out of the opening when a pivoting force is applied to the release handle.

6. The window assembly of claim 1, wherein the pressure applied by the biasing mechanism can be adjusted by adjusting the spring compression.

7. The window assembly of claim 6, wherein the biasing mechanism further comprises a screw that is adapted to adjust the compression of the spring.

8. A window assembly adapted for mounting in a wall having an opening, comprising:
   a frame configured to receive and support a glazing, wherein the frame is positioned adjacent the opening and can be pivoted outwardly from the opening;
   a latch assembly adapted to secure the frame to the wall in a closed, latched position and release the frame from the wall to an open, unlatched position;
   a release assembly comprising a release handle and at least one hinge member, wherein the release handle is operatively interconnected to the latch assembly and configured to actuate the latch assembly to release the frame from the wall, wherein the release handle is movable from an initial, non-releasing position to a final, releasing position;
   a biasing mechanism adapted to hold the release handle in the final, releasing position by applying a first pressure to the release handle, wherein the first pressure is exerted against the release handle in a direction substantially parallel to the axis of rotation of the release handle, wherein the first pressure inhibits the release handle from returning to the initial, non-releasing position; and wherein the release handle is operatively connected to the latch assembly by a connecting member, wherein the connecting member is configured with a pre-determined amount of slack so as to permit the release handle to be raised to an intermediate, non-releasing position without actuating the latch assembly.

9. The window assembly of claim 8, wherein the connecting member comprises a cable.

10. A window assembly adapted for mounting in a wall having an opening, comprising:
a frame configured to receive and support a glazing wherein the frame is positioned adjacent the opening and can be pivoted outwardly from the opening;
a latch assembly adapted to secure the frame to the wall in a closed, latched position and release the frame from the wall to an open, unlatched position;
a release assembly comprising a release handle and at least one hinge member, wherein the release handle is operatively interconnected to the latch assembly by a connecting member and configured to actuate the latch assembly to release the frame from the wall, wherein the release handle is movable from a final, releasing position to an intermediate, non-releasing position before reaching a final, releasing position, wherein the connecting member is configured with a pre-determined amount of slack so as to permit the release handle to be maintained at the intermediate, non-releasing position while the latch assembly is urged against a striker bolt;
a biasing mechanism adapted to hold the release handle in the final, releasing position;
wherein the connecting member comprises a cable; and
wherein the latch assembly further comprises a trip lever that can be actuated by the cable to move the latch assembly into an unlatched position.

11. The window assembly of claim 10, wherein the cable is looped through an opening formed in the trip lever and fixedly attached to the release handle in a manner such that when the release handle is raised, the release handle exerts a pulling force on the cable.

12. The window assembly of claim 11, wherein when sufficient pulling force is exerted on the cable, the cable becomes taut and exerts a pulling force on the trip lever to actuate the trip lever.

13. The window assembly of claim 11, wherein the cable is configured with a pre-determined amount of slack so that the release handle can be raised from the initial, non-releasing position to the intermediate position without causing the cable to become sufficiently taut to trigger the trip lever.

* * * * *

UNITED STATES PATENT AND TRADEMARK OFFICE
CERTIFICATE OF CORRECTION

PATENT NO. : 6,932,395 B1
DATED : August 23, 2005
INVENTOR(S) : Steffen R. Du Bois It is certified that error appears in the above-identified patent and that said Letters Patent is hereby corrected as shown below:

Column 8,
Line 28, delete "a" and insert -- the --.
Line 40, delete "substantial" and insert -- substantially --.

Column 9,
Line 17, after "glazing" add -- , --.

Signed and Sealed this

Twenty-first Day of March, 2006

JON W. DUDAS
*Director of the United States Patent and Trademark Office*